US008943046B2

(12) United States Patent
Chow

(10) Patent No.: US 8,943,046 B2
(45) Date of Patent: Jan. 27, 2015

(54) RESOURCE HUBS FOR HETEROGENEOUS GROUPS

(75) Inventor: Edmond K. Chow, Hong Kong (HK)

(73) Assignee: Vitacount Limited, Hong Kong (HK)

( * ) Notice: Subject to any disclaimer, the term of this patent is extended or adjusted under 35 U.S.C. 154(b) by 323 days.

(21) Appl. No.: 13/175,021

(22) Filed: Jul. 1, 2011

(65) Prior Publication Data

US 2012/0005215 A1 Jan. 5, 2012

Related U.S. Application Data

(60) Provisional application No. 61/361,384, filed on Jul. 3, 2010.

(51) Int. Cl.
*G06F 17/30* (2006.01)
*G06F 7/00* (2006.01)

(52) U.S. Cl.
USPC ............................ 707/723; 707/741; 707/736

(58) Field of Classification Search
CPC ... G06Q 30/02; G06Q 10/10; G06Q 30/0255; G06Q 30/0254; G06Q 30/0601; G06Q 30/0247; G06Q 30/0267; G06Q 30/0269; G06Q 30/0282; G06Q 10/00; G06Q 30/0243; G06Q 30/0251; G06Q 30/0631; G06Q 40/02; G06Q 10/06; G06Q 30/00; G06Q 30/0207; G06Q 30/0253; G06Q 30/0256; G06Q 30/0261; G06Q 30/06; G06Q 40/04; G06Q 40/10; G06Q 10/063; G06Q 10/063114; G06Q 10/06312; G06Q 10/06393; G06Q 20/10; G06Q 30/0202; G06Q 30/0203; G06Q 30/0204; G06Q 30/0215; G06Q 30/0217; G06Q 30/0239; G06Q 30/0241; G06Q 30/0246; G06Q 30/0263; G06Q 30/0273; G06Q 30/0275; G06Q 30/0279; G06Q 30/0283

USPC ......................................... 707/723, 741, 736
See application file for complete search history.

(56) References Cited

U.S. PATENT DOCUMENTS

| | | | | |
|---|---|---|---|---|
| 6,631,184 | B1 * | 10/2003 | Weiner | 379/92.01 |
| 6,963,850 | B1 * | 11/2005 | Bezos et al. | 705/7.29 |
| 7,031,961 | B2 | 4/2006 | Pitkow et al. | |
| 7,703,030 | B2 * | 4/2010 | Smirin et al. | 715/765 |
| 7,730,030 | B1 | 6/2010 | Xu | |
| 7,937,391 | B2 * | 5/2011 | Chea et al. | 707/736 |
| 7,983,927 | B2 * | 7/2011 | McGill et al. | 705/1.1 |
| 7,995,505 | B2 * | 8/2011 | Beaupre et al. | 370/276 |
| 8,296,356 | B2 * | 10/2012 | Obasanjo et al. | 709/203 |

(Continued)

FOREIGN PATENT DOCUMENTS

| | | | |
|---|---|---|---|
| CN | 101116051 | A | 1/2008 |
| CN | 101482884 | A | 7/2009 |
| CN | 101751448 | A | 6/2010 |

OTHER PUBLICATIONS

Victor et al., A Comparative Analysis of Trust-Enhanced Recommenders for Controversial Items, 2009, pp. 342-345.*

*Primary Examiner* — Kuen Lu
(74) *Attorney, Agent, or Firm* — Baker & Hostetler LLP

(57) ABSTRACT

An invention is disclosed for providing a digital resource gathering and dissemination system, method, or process that can accommodate digital resources of interest for heterogeneous groups and communities of online users for the same topic, demographic, or some other categories as provided by a particular classification scheme. Such a system, method, or process also provides a more reliable or otherwise representative selection of digital resources of interest to the population as a whole.

40 Claims, 6 Drawing Sheets

(56) References Cited

U.S. PATENT DOCUMENTS

| | | | | |
|---|---|---|---|---|
| 2002/0174429 | A1* | 11/2002 | Gutta et al. | 725/46 |
| 2004/0267625 | A1 | 12/2004 | Feng et al. | |
| 2005/0289163 | A1* | 12/2005 | Gordon et al. | 707/100 |
| 2006/0074864 | A1 | 4/2006 | Naam et al. | |
| 2006/0173556 | A1* | 8/2006 | Rosenberg | 700/3 |
| 2007/0143281 | A1* | 6/2007 | Smirin et al. | 707/5 |
| 2008/0147659 | A1 | 6/2008 | Chen et al. | |
| 2009/0112974 | A1* | 4/2009 | Ravikumar et al. | 709/203 |
| 2009/0234735 | A1* | 9/2009 | Maurer | 705/14 |
| 2010/0042618 | A1* | 2/2010 | Rinearson et al. | 707/5 |
| 2011/0113100 | A1* | 5/2011 | Chawla | 709/205 |
| 2011/0225139 | A1* | 9/2011 | Wang et al. | 707/709 |
| 2012/0102410 | A1* | 4/2012 | Gewecke et al. | 715/738 |
| 2012/0144413 | A1* | 6/2012 | Wang et al. | 725/13 |
| 2012/0221357 | A1* | 8/2012 | Krause et al. | 705/4 |
| 2012/0271831 | A1* | 10/2012 | Narayanan et al. | 707/741 |

* cited by examiner

| Rank | Hub1 | Hub2 | Hub3 | Hub4 | Hub5 | Provider-Wide |
|---|---|---|---|---|---|---|
| 1 | Resource 234 | Resource 234 | Resource 343 | Resource 432 | Resource 12333 | Resource 234 |
| 2 | Resource 334 | Resource 3542 | Resource 432 | Resource 23343 | Resource 442243 | Resource 432 |
| 3 | Resource 23343 | Resource 432 | Resource 3233 | Resource 334 | Resource 2323 | Resource 334 |

506

RESOURCE HUBS FOR HETEROGENEOUS GROUPS

CROSS REFERENCE TO RELATED APPLICATIONS

This application claims benefit under 35 U.S.C. §119(e) of provisional U.S. patent application No. 61/361,384, filed Jul. 3, 2010, the contents of which are incorporated herein by reference in its entirety.

BACKGROUND

The World Wide Web (or simply called the Web) has made dissimulation and publication of digital resources (e.g., webpages, news, blogs, statements, photos, opinions, offers, music, videos, applications) so easy that a pyramid of digital resources of various kinds are available online. It has become difficult for many online users to decide what to read or consider, or to uncover digital resources of interest to him or her.

There are systems that allow an online user to positively or negatively rate a certain piece of news, article, opinion, or some other information item of a certain topic. Such a system displays, advertises, or otherwise publishes these information items that are deemed by the system as the most recommended or the more favorable based on such user recommendations. These selected information items are herein collectively referred to as prize digital resources. Digital resources such as news items may be made popular through resource sharing or social networking websites. Substantial online content that attracts advertising revenues or becomes widely known have originated or otherwise receive recommendation via these websites and systems.

However, the current art treats the membership population of these websites and systems as homogeneous, where members having diverse or heterogeneous interests may not easily be able to discover or share their content of interest more efficiently or widely, while contributing to the overall relevancy of such content to the population as a whole. For instance, the prize digital resources so determined in accordance to the current art purportedly represent the interest of the whole population or community, when in fact the online users are heterogeneous (by nature or otherwise, such as age, nationality, gender, religion, and so on). This simplistic approach does not facilitate information dissemination of interest to relevant parties. In addition, it might encourage an online user to game or manipulate the systems or their ranking/rating methods so that the articles, news, opinions, and information items of other kinds that they have a vested interest in promoting would become prize digital resources. Other online users who want to see their favorite digital resources unsuppressed by the prize ones would either do their own counter gaming or manipulation, or simply be regarded not as a group of people whose interests are not "important" enough to be heard or seen.

SUMMARY

The present invention solves the above problems and related issues by providing a digital resource gathering and dissemination system, method, or process that can accommodate digital resources of interest for heterogeneous groups and communities of online users for the same topic, demographic, or some other categories as provided by a particular classification scheme. Such a system, method, or process also provides a more reliable or otherwise representative selection of digital resources of interest to the population as a whole.

Disclosed are techniques for rating a digital resource among heterogeneous groups of users in hubs. In embodiments, a hub provider makes available the digital resource to a first hub and a second hub, the first hub comprising a first plurality of members and the second hub comprising a second plurality of members, the first plurality of members differing from the second plurality of members, each member having a member account. In embodiments, one member may be a group of both the first and second pluralities of members, though the sets of members in the first and second pluralities of members differ. The hub provider may then receive a first rating for the digital resource from a first member of the first hub, and receive a second rating for the digital resource from a second member of the second hub. The hub provider may then determine a first hub-level score for the first hub based on the first rating; determine a second hub-level score for the second hub based on the second rating; and determine an overall score for the digital resource based on the first hub-level score and the second hub-level score. The hub provider may store an indication of the first hub-level score, second hub-level score, and overall score in a memory.

Disclosed are methods and systems for distributing digital resources and identifying prize resources and their contributors among heterogeneous users. For instance, a method for selecting more than one set of digital resources among a plurality of digital resources is described, the method comprising:

- making available a plurality of digital resources in a plurality of hubs, each hub having a plurality of members, wherein each member may be associated with a home hub;
- presenting the plurality of digital resources to the plurality of members in the plurality of hubs;
- accepting a member rating from the plurality of members against the plurality of digital resources, wherein the member rating includes a favorable rating or an unfavorable rating;
- determining a hub-level score for each of the plurality of hubs against one or more digital resources of the plurality of digital resources based at least in part on the member rating;
- determining an overall score against each of the one or more digital resources based at least in part on the hub-level score; and
- selecting more than one set of digital resources, a set based at least in part on the overall score and another set based at least in part on the hub-level score in relation to one of the plurality of hubs, wherein the set and the other set include an ordered list of references to digital resources.

In relation to this method, the plurality of digital resources may include one or more digital resources being available in two or more hubs of the plurality of hubs. Each of the more than one set of digital resources may include one digital resource or one or more references to digital resources, and the plurality of members may include a plurality of email addresses. In addition, the making available a plurality of digital resources may include storing the plurality of digital resources, hubs, and user accounts in a database, and selecting the more than one set of digital resources may include storing the more than one set of digital resources in the database. The making available may also include receiving submissions from the plurality of members, the submissions including digital resources or references to the digital resources and member ratings, wherein the references may include URLs. The selecting may also include presenting the set of digital resources to the plurality of members and the other set of digital resources to members of the hub having the other set of digital resources associated with the hub-level score. Furthermore, the accepting a member rating may include considering the member rating only for the home hub. Each of the plurality of members may belong to only one of the plurality of hubs. The method may further comprise:

determining eligibility of a user for membership of a hub, wherein the determining includes what the user is, where the user claims to reside or is located, what the user claims to believe, what the user can do, or what digital resources the user has given a favorable rating against;

accepting the user as a member if the user is determined to be eligible;

rejecting the user as a member if the user is determined to be not eligible.

determining if a member should be removed from a hub; and removing the member from the hub, if the member is determined to be removed; and keeping the member in the hub, if the member is determined not to be removed.

Moreover for the method, the determining if a member should be removed may include detecting a certain number of prize digital resources in the hub receiving an unfavorable rating from the member over a period of time or among a number of prize digital resources, and detecting a plurality of digital resources each receiving a favorable rating from the member and not becoming a prize digital resource in the hub over a period of time or among a number of digital resources available in the hub.

The method may further comprise:

determining a prize user based at least in part on the set of digital resources, wherein the prize user has submissions comprising one or more resources in the set;

determining a prize member based at least in part on the other set of digital resources, wherein the prize member has submissions comprising one or more resources in the other set; and determining a prize hub based at least in part on the set of digital resources, wherein the prize hub has a hub-level score for one or more resources in the set.

The present invention also includes a system for generating a plurality of selections of resources from a plurality of resources, comprising:

a hub storage medium for storing a plurality of hubs in a database;

a user storage medium for storing a plurality of user accounts in a database;

a resource storage medium for storing a plurality of resources in a database;

a relationship storage medium for storing a plurality of relationships in a database;

a communication interface component configured to send and receive data to and from a user via a user device over a network, the user having a user account in the user storage medium, the user having a membership relationship between the user account and one or more of the plurality of hubs in the relationship storage medium, and the data including one or more submissions, each having a recommended resource or a rating, the recommended resource comprising a reference to a resource, and the rating comprising a target resource, wherein the target resource includes a recommended resource;

a user interface component configured to interact with the user or the user device, the interacting including receiving the one or more resource submissions, and presenting a selection of digital resources to the user or the user device;

a submission handler component configured to receive one or more recommended resources and ratings;

a resource analyzer component configured to determine if each of the one or more recommended resources exists in the resource storage medium, and add the recommended resource to the resource storage medium if the recommended resource does not already exist in the resource storage medium, the recommended resource including an overall score, a user account, and a timestamp;

a resource distributor component is configured to determine if an availability relationship between the recommended resource and each of the one or more hubs exists in the relationship storage medium, and add an availability relationship between the recommended resource and the hub in the relationship storage medium if the availability relationship does not already exist in the relationship storage medium, the availability relationship including a hub-level score, a user account, and a timestamp;

a score generator component is configured to determine if an availability relationship between each of the one or more target resources and each of the one or more hubs exists in the relationship storage medium, and update the hub-level score in the availability relationship based at least in part on the rating if the availability relationship exists in the relationship storage medium, and to update the overall score in the target resource in the resource storage medium based at least in part on the hub-level score; and a list maker component configured to generate a plurality of selections of digital resources, one selection based at least in part on the overall scores of the digital resources in the resource storage, and the other selections based at least in part on the hub-level scores of the digital resources for the one or more hubs, the generating including presenting the plurality of selections to the user via the user device, wherein the one selection includes the overall scores, and the other selections include the hub-level scores.

The system may also include a membership controller component configured to:

check if an activity relationship between the user account in relation to the user and the one of the one or more hubs exists in the relationship storage medium within a period of time, wherein the activity relationship includes but not limited to submission of a resource to the one hub, or rating of a resource in the one hub, and wherein the period of time comprises three months, and is modifiable by an authority of the one hub;

assert that the user be removed from the one hub if the activity relationship does not exist in the relationship storage medium within the period of time; and remove in the relationship storage medium the membership relationship between the user account in relation to the user and the one hub if the user should be removed from the one hub.

BRIEF DESCRIPTION OF THE ILLUSTRATIVE EMBODIMENTS

DETAILED DESCRIPTION OF ILLUSTRATIVE EMBODIMENTS

Figure 1:
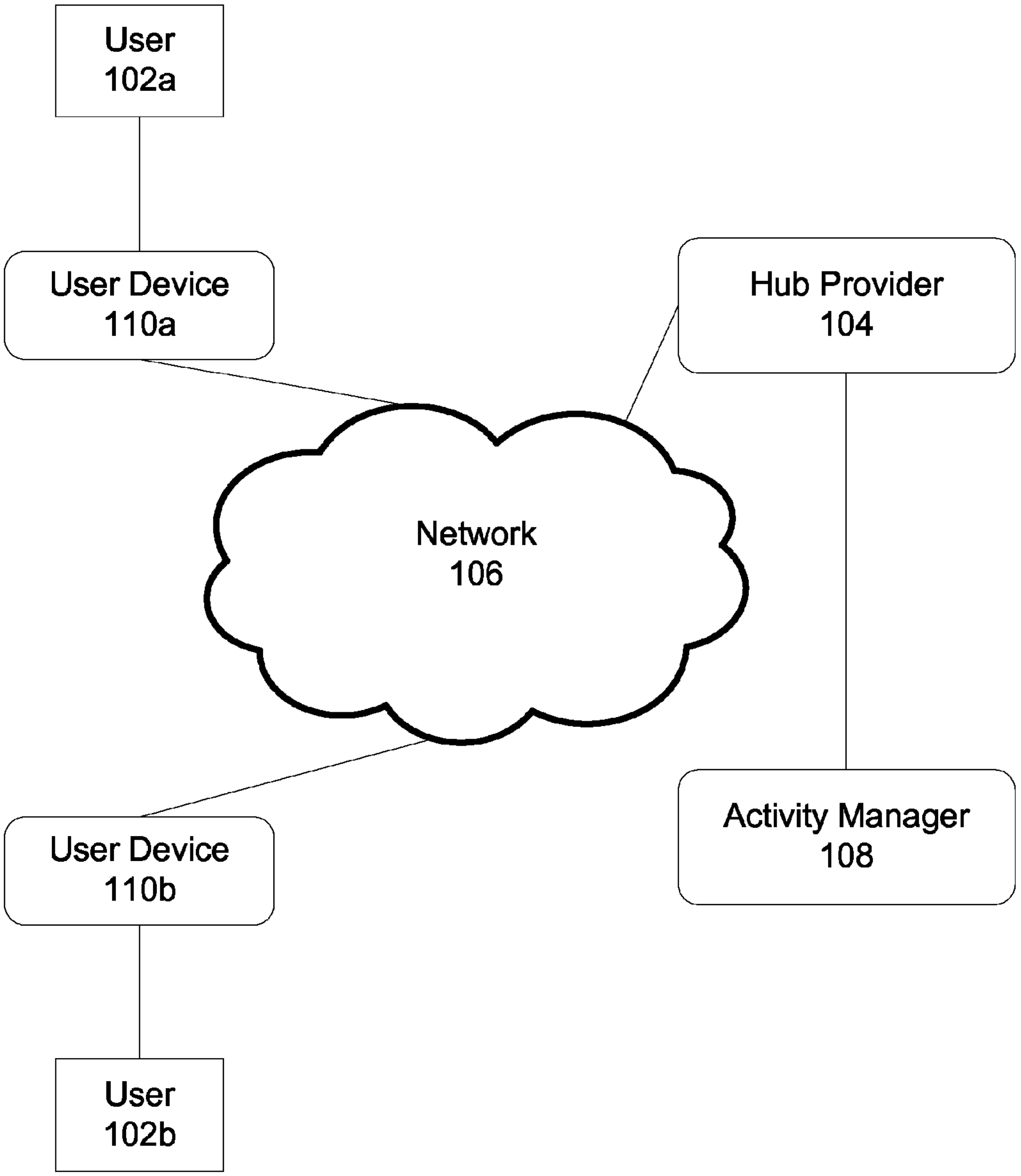
FIG. 1 illustrates an exemplary environment for distributing digital resources and identifying prize resources and their contributors among heterogenous users.

A digital resource hub (or simply hub herein) provides dissemination or distribution of digital resources (or simply resources herein) to its users. A user may rate resources to recommend them or otherwise increase their visibility to other users. A hub may limit its access to members. Membership may simply entail a registration (e.g., by email address) or criteria pertaining to a user's physical characteristics (e.g., gender, age, ethnicity), location (e.g., residence, current position), beliefs (e.g., religion, political views), ability (e.g., language, IQ test score), and so on. Membership may also be established or determined continually or per some session or operation, such as those based on GPS positions, personal interests at the moment, and so on. For example, a hub provider may create a plurality of multi-level hubs based on geographical positions for recommended beverage and food. The finest level may represent a radius of 50 meters or an area of 50 times 50 meters square, with a higher level being a composite of four of the previous level (i.e., 100 times 100, 200 time 200, and so on). The geographical extent or coverage of a hub (or its center and dimensions relative to the center) may be pre-assigned by the hub provider, or is determined relative to the position where the user is at the moment of his request for lists of relevant resources (i.e., those of recommend food and beverage), or some combination thereof. The hub provider may respond to a user's location-specific query with a plurality of resource lists, each comprising highly recommended food and beverage items at each level of area coverage, except at the lowest level, based at least in part on the hub-specific scores at the lower levels, whose score would be determined based at least in part on ratings given by users in the geographical area corresponding to that level.

Members may assume different roles as administrators, scouts, reviewers and observers, each of which might require a different set of membership criteria. Administrators or a hub authority may be creators or owners of a hub. Scouts are members who may submit or recommend resources to the hub. Reviewers are those who may provide ratings for resources available in the hub. Observers may access the resources but may neither bring resources into the hub nor provide any rating. Any type of membership role is within the scope of various embodiments. According to one embodiment, a member may assume multiple membership roles.

An authority of a hub may establish or otherwise choose rules for operation, administration and maintenance of the hub, such as those for membership, resource submissions, and resource import and export. There may be multi-tiered levels of authority, where the higher level may delegate some power to the lower level. For instance, a hub provider may assume the highest level of authority for all hubs under its jurisdiction while a hub administrator is responsible for a particular hub. For example, a local hub authority (e.g., a hub administrator) may choose for a hub the applicable membership roles as made available by the hub provider, and have each member assigned to its intended role, centrally or otherwise, while the hub provider may be responsible for rules in ranking resources in the hub based at least in part on ratings given by members of the hub. A hub authority may decide whether to make available to other hubs resources as discovered or otherwise submitted by the hub's members, and if so, under what criteria, if any. Likewise, a hub authority may decide if his hub would accept such public resources, and if so, under what criteria, if any. A hub authority may also decide the circumstances under which a member be removed from the hub. A hub authority may further be established by some voting scheme, where a new hub administrator or new rule may be elected or enacted by a majority of qualified members (e.g., where observers are not allowed to vote).

A hub may present or otherwise make available a plurality of lists of resources, such as the latest and the prize, which may be updated continuously, periodically, or from time to time. The latest list shows a list of resources whose order is mainly influenced by chronological considerations, e.g., from the most recent to the least. (The latest list may comprise resources submitted or otherwise recommended by the hub's members, imported from other hubs, or received as public resources). The prize list shows a list of resources whose order is mainly influenced by relevancy considerations, e.g., from most popular to the least, where the more recent may be considered more popular when all other factors are equal. In embodiments, a user or member may provide a rating against a resource on each of the two lists. According to one embodiment, only one rating is counted for a resource for each unique user or member, and should the user or member belong to more than one hub, then a home hub or a hub priority list would be established to determine which hub should receive the rating in question. A user's hub priority list identifies a plurality of hubs whose hub-level scores may include the user's rating. In one embodiment, the weight of the user's rating may decrease gradually for hubs on the lower order of the hub priority list.

For each hub, the prize list of resources would usually demand more attention from its members than the latest list. This may result in resources on the former list (namely prize resources) attracting more ratings from members who would have otherwise missed them, e.g., the members' not checking out resources on the latest lists (namely latest resources). Given the potential heterogeneity of hubs and their constituent members, a resource may be popular in one hub while barely known in another, even though it might have appeared on the latest lists of both hubs. A hub provider enables the existence of a plurality of hubs that may accommodate different interests and intents. No one single homogenous group of users may easily dominate the opinions about resources and take control of their dissemination under a single jurisdiction. As such, a resource has a much better chance of reaching an appreciative audience.

In addition, a resource may obtain different ratings or scores from a plurality of hubs, and an overall score may be derived based on these hub-level scores. In embodiments, the hub-level scores assigned to different hubs are normalized or otherwise made according to the same scoring system, such that they may be directly compared with each other, and combined to create an overall score. Such an overall score may help determine the relevancy of a resource to a population under a jurisdiction (e.g., that of a hub provider). Furthermore, a prize user, member or hub may be identified, when a user, a member or a hub's members are consistently discovering prize resources, at the hub or provider level.

According to one embodiment, a hub is regarded as an organization characterized by a culture realized via some membership criteria and agreements which may include considerations in beliefs, languages, age, gender, religion, professional affiliation, and so on. Users not compatible with or otherwise interested in one organization may have membership with other organizations (i.e., hubs). Existing members may lose their membership should they fail to fulfill the membership criteria or agreements imposed by the hub in question. Like minded would gradually gather at appropriate hubs, whose otherwise heterogeneous cultures would help not only to promote resources of interest to their peers and members, but also identify and select popular or prize ones for all users in the hub provider as a whole. According to one embodiment, the hub provider may be a social network, and hubs may be groups within the social network. According to another embodiment, the hub provider may comprise a collection of entertainment and news providers, and a hub may comprise individuals, a group, a company, or an organization subscribing to services of any of these entertainment and news providers.

FIG. 1 illustrates an exemplary environment for distributing digital resources and identifying prize resources and their contributors among heterogeneous users. A plurality of users 102*a*, 102*b* are communicatively coupled to a hub provider 104 via their respective user devices 110*a*, 110*b* to a network 106. The hub provider 104 may comprise a plurality of hubs (not shown) each associated in membership with one or more of the plurality of users 102*a*, 102*b*. According to one embodiment, the hub provider 104 may interact with a plurality of users 102*a*, 102*b* at their devices via a website. A user may search, join, create and visit a hub on the website. According to some embodiments, an administrator may set up rules for membership subject to constraints, if any, by the hub provider 104.

A hub may be realized as a website where any user102*a*, 102*b* of the hub provider 104 may view or access content therein, including a list of most recent resources and a list of current prize resources, and where only authenticated users102*a*, 102*b* may submit or recommend resources to the hub of which they are a member. An authenticated user 102*a*, 102*b* may submit a resource via a submission page of the website, a toolbar on a Web browser, a submission link for the hub provider 104 carried by a third-party website, or some other mechanisms whereby a resource or a reference (e.g., URL) to a resource may be submitted by a user102*a*, 102*b* along with a user identity known to the hub provider 104. Any type, scheme, or mechanism of submission is within the scope of various embodiments.

The hub provider 104 may cache or otherwise retrieve a copy of the resource in question, and create a new reference to the copy for backup or faster retrieval, while maintaining the original reference and making it available to its users 102*a*, 102*b*. In addition, a user102*a*, 102*b* may specify a submission as private, in that only a designated hub (e.g., a hub to which he is a member) may receive the submission.

In one instance, a user 102*a*, 102*b* associated with a user device 110*a*, 110*b* requests a resource (e.g., via a reference such as a URL) from the latest resource list of a hub. Once authenticated as a member of the hub, the user102*a*, 102*b* may provide a rating against the resource. The resource may be made available on the current prize resource list of the hub should the hub provider 104 determine that the resource has attained a certain score, whether or not in relation to other resources available in the hub. On the prize resource list, the resource may continue to receive ratings (positive or negative) from members who have not rated it yet. The resource may be removed from both the prize and latest list if it no longer satisfies the criteria that govern the selection of resources for either of the lists.

An activity manager 108 is coupled to the hub provider 104. The activity manager 108 monitors or receives user activities that may result in changes in availability of digital resources, in ratings or scores (e.g., those of resources, hubs, members, and users102*a*, 102*b*) and if applicable, in memberships to hubs. In one instance, the activity manager 108 receives a reference to a digital resource from a user 102*a*, 102*b* associated with a user device 110*a*, 110*b*. The activity manager 108 checks if the digital resource already exists in his hub(s) or the hub provider 104, subject to the submitter's privacy preference, which may be set in a user profile or at the time of submission. If the resource is considered as publicly available (e.g., having been introduced to the hub provider), such a submission may be counted as a positive user or member rating for the resource, and the submitter may be notified of other users (as well as their hubs) who have submitted the same resource publicly, or of hubs (e.g., those to which the submitter is member) that already have the resource available, subject to their privacy settings, if any. Wherever applicable, the submitter may be credited as having made available the resource to his hub(s) or the hub provider 104. According to one embodiment, original submissions themselves in relation to a hub or the hub provider 104 do not contribute to hub or overall ratings of their corresponding resources. The activity manager 108 may forward or otherwise distribute the newly submitted public resource to the submitter's hub(s) or hubs that accept public resources. According to some embodiments, the activity manager 108 comprises a module associated with the hub provider 104.

Figure 2:
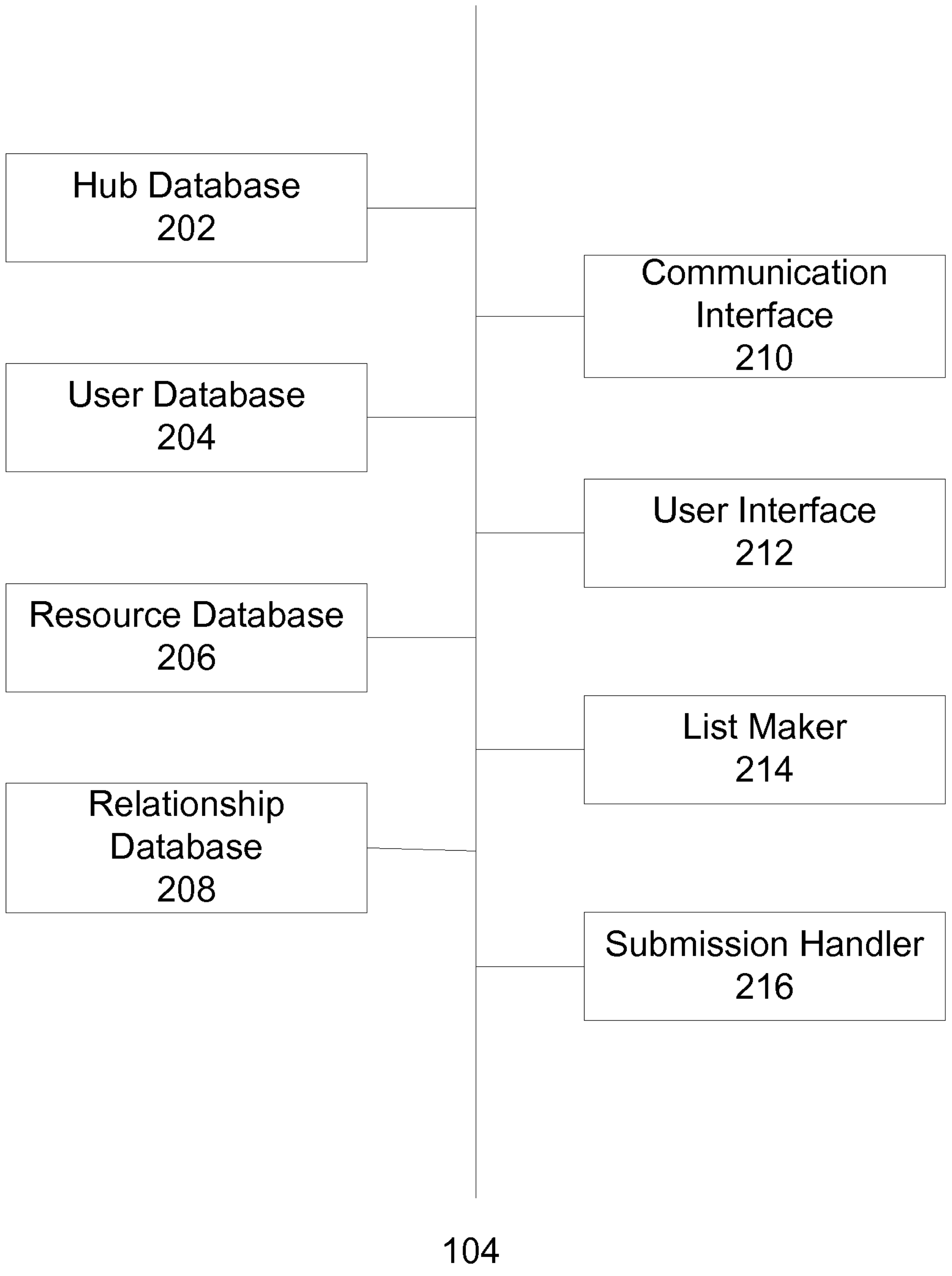
FIG. 2 shows a block diagram of an exemplary hub provider, such as the hub provider shown in FIG. 1.

FIG. 2 shows a block diagram of an exemplary hub provider 104, such as the hub provider 104 shown in FIG. 1. A hub database 202 is provided for storing data associated with each hub, such as membership rules, scores, ranks (e.g., those based on membership size and number of provider-wide prize resources originated), and resource import and export lists and constraints (e.g., hubs from and to which resources are received and forwarded respectively, and if a resource should be exported, and how many times an exportable resource originated from the hub may be forwarded by other hubs), and if public resources are to be received.

A user database 204 is provided for storing data associated with each user 102*a*, 102*b* (in a user account), such as his ranks (e.g., those based on numbers of hub-specific and provider-wide prize resources respectively), and user ID and password for the hub provider 104.

A resource database 206 is provided for storing resources and/or their references, as well as other related data such as their time of availability, overall rating or score, and local copy and reference.

A relationship database 208 is provided for storing data associated with relationships among hubs, users and resources, as well as their attributes such as popularity or scores. For example, it may store the membership relationship between a user102*a*, 102*b* and one or more hubs, and a rating of his contribution for each hub (e.g., the number of prize resources that he submitted into the hub), and support query for the membership of a hub. It may store the availability relationship between a hub and one or more resources, and a rating for each resource in the hub, and support query for all hub-level ratings for each resource. It may also store activity relationships between a user having a user account and one or more hubs, as well as those between a user having a user account and one or more resources (or their references). Such activity relationships include but not limited to submission of a resource to a hub, rating of a resource, and rating negatively of a prize resource in a hub.

A communication interface 210 is provided for communicating with devices and users over a network 106, such as a user102*a*, 102*b* via the user device 110*a*, 110*b* shown in FIG. 1. A device or a user102*a*, 102*b* via a user device 110*a*, 110*b* may send and receive data (e.g., rating and resource submissions, hub membership requests and responses, and personal preferences) to and from the hub provider 104 via the communication interface 210. Any type of communications interface is within the scope of various embodiments.

A user interface 212 is provided for interacting with users or user devices 110*a*, 110*b*, and it includes the logic or procedures for user logon and logoff, presentation of hub-specific and provider-wide views having lists or selections of latest and prize resources, filtering and sorting of entities such as resources, hubs and the like, and hub creation and signup. Any layout, format, mode (e.g., audio), policy, scheme, or rules pertaining to presentation of resources and other entities such as hubs, users, relationships and the like are within the scope of various embodiments. The user interface 212 may also be equipped with a search engine or search module (not shown), or otherwise configured to provide indexing and searching services for entities such as resources, users, hubs, relationships and the like in the hub provider 104. Corresponding indexes, if any, may be stored and maintained in the databases for the entities of interest (e.g., the hub database 202, the user database 204, the resource database 206, and the relationship database 208), or some other databases.

A list maker 214 is provided for creating and maintaining lists or selections of latest resources and those of prize resources for the hub provider 104 and each hub therein. For instance, the relationship database 208 may provide the list maker 214 with the latest (and historical) aggregate ratings or popularity scores for a resource in a particular hub, so that the list maker 214 may create and maintain a list of prize resources at a given time for a hub. The resource database 206 may provide the list maker 214 with the latest (as well as historical) overall scores or popularity ranks for a resource.

A submission handler 216 is provided to process submissions from users102*a*, 102*b* or user devices 110*a*, 110*b*, namely resources (or their references) and ratings against resources. According to one embodiment, the submitted resources (including their references) and ratings may be stored in the resource database 206 and the relationship database 208 respectively. Resource entries in the resource database 206 may include a timestamp indicating time and date of the submission, identification of the user 102*a*, 102*b* providing the submission (i.e., the submitter), his preference for whether to make the submission public (i.e., whether it be available to other hubs to which he is not a member), and the like. Rating entries in the relationship database 208 may include a timestamp of the submission, the submitter (or his ID), the hubs (or their IDs) to which the submitter is a member, and the like. These submissions and ratings (and other entities such as hubs, users, relationships, and the like) may be stored in a single or multiple databases, including the resource database 206, the user database 204, the resource database 206, the relationship database 208, and the like. One or more databases described herein may be located remotely and accessed by the hub provider 104 or any component, system or device coupled to the hub provider 104, subject to any applicable authentication control and access policy. A timestamp or other chronological information may be associated with each entry in these databases. The user interface 212 may feed or otherwise provide the submission handler 216 with resources and ratings from a user 102*a*, 102*b* or user device 110*a*, 110*b*. The submission handler 216 may include modules or functions for processing these resources and ratings, or act as a proxy or agent to a component, system or device comprising such components and functions, or a combination thereof. According to some embodiments, the submission handler 216 may be optional.

Figure 3:
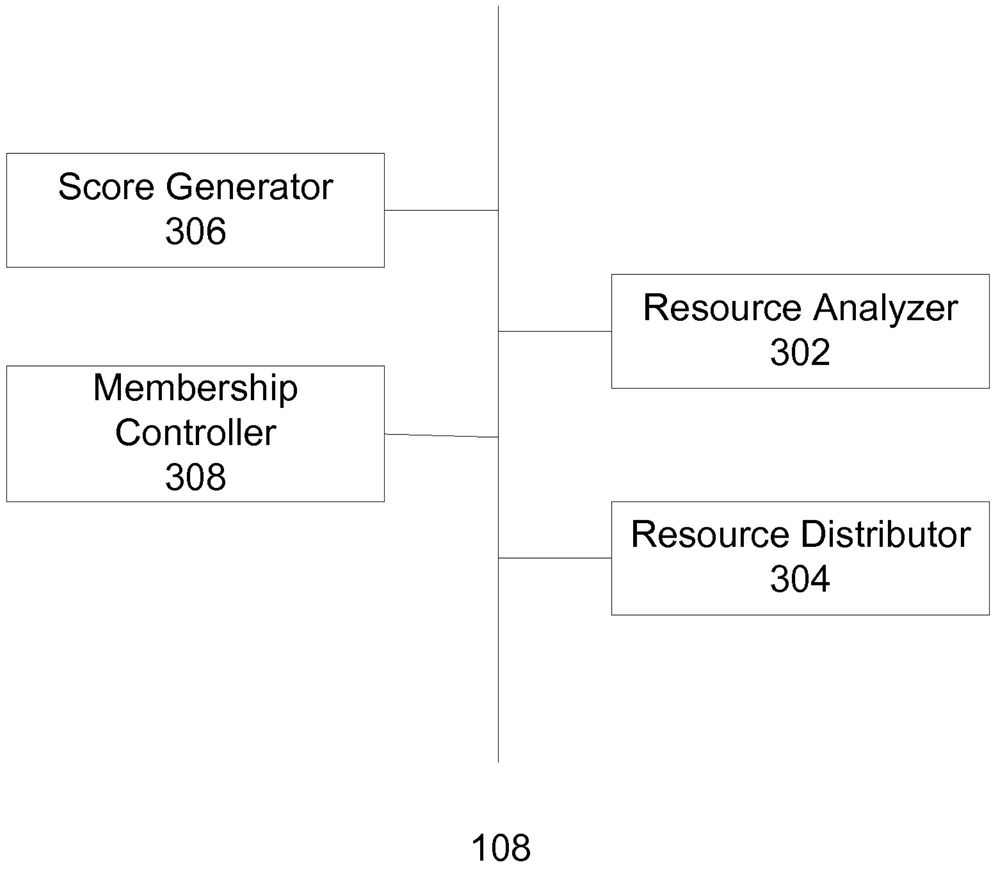
FIG. 3 shows a block diagram of an exemplary embodiment of the activity manager of FIG. 1.

The activity manager 108 shown in FIG. 1 is such an exemplary component, system and device. FIG. 3 shows a block diagram of an exemplary embodiment of the activity manager 108. The activity manager 108 comprises a resource analyzer 302, a resource distributor 304, a score generator 306, and a membership controller 308. According to some embodiments, the membership controller 308 may be optional.

The resource analyzer 302 determines if the submitted resource already exists in the provider hub (for instance, by checking the resource database 206). It may also create a local copy of the resource along with a new reference, store them in the resource database 206, and maintain the relationship between the copy and the original in the relationship database 208. In addition, multiple resources may be related to one another, for instance, for the purpose of popularity rating. For example, multiple linguistic translations or versions to the same news reporting, while having different URLs, may be regarded as referring to the same news item. On the other hand, resources having the same URL might be regarded as different resources, for example, when a newer and distinguishable version has been made available via the same URL, such as a newer version of software or a news front page with a newer publication date. The resource analyzer 302 creates a resource entry in the resource database 206 when the submitted resource is considered new. In an embodiment where submission of an existing resource (at the hub or provider level) is considered as a positive rating from a user 102*a*, 102*b* when he has not yet rated the resource, the resource analyzer 302 may create an internal rating submission for the resource, and the user 102*a*, 102*b* may then be considered as having rated it (at the hub or provider level, wherever applicable).

The resource distributor 304 identifies the hubs to which a submitted resource be made available based at least in part on hub membership of the submitter, and delivers the resource to the hub(s). Where an embodiment may support the creation and receipt of public resources, the resource distributor 304 determines whether the submitted resource should be made available to hubs which are configured or otherwise identified to accept public resources and to which the submitter is not a member. The submitter may provide a privacy setting that causes the resource be only made available to all his associated hubs (e.g., with membership), or some specific individual hubs or groups of hubs. Where an embodiment may support a private personal hub (i.e., to which no other users may have access except the user owner), the submitter may specify a privacy setting that causes the resource available to no hubs but his private personal hub. (A private personal hub, for example, may record all resources submitted and those rated positively by its owner, and highlight those being made prize at a hub or in the whole of the hub provider 104.) Such a privacy setting may be specified as part of a user account in the hub provider 104 (e.g., in the user database 204) and/or as part of a resource submission. The latter, if present, may override the former. The delivery of resources to their destination hubs may be realized via entries to the relationship database 208, where an entry relates or associates a destination hub in the hub database 202 to or with the resource in the resource database 206. The entry may comprise such a relationship, the date and time of association, the current and historical cumulative positive and negative ratings of the resource for the hub, and the like. The list maker 214 as shown in FIG. 2 would then be able to make it available to users of the hub via the user interface 212.

In some embodiments, the resource distributor 304 may be configured to attach or otherwise associate advertising to or with a resource destined to a hub. Examples of advertising include, but are not limited to, a depiction of a product, a depiction of a logo, a display of a trademark, an inducement to buy a product, an inducement to buy a service, an inducement to invest, an offer for sale, a product description, trade promotion, a survey, a political message, an opinion, a public service announcement, news, a religious message, educational information, a coupon, entertainment, a file of data, an article, a book, a picture, travel information, and the like. In addition, the format of the advertising may include, singularly or in combination, an audio or animation or other multimedia element played at various times, banner advertising, network links, e-mail, images, text messages, video clips, audio clips, programs, applets, cookies, scripts, and the like. Furthermore, each instance, entity, or object of advertising itself may be regarded as a resource, and be maintained in the resource database 206 or some other databases. Its relationship with one or more resources (and/or with possibly other entities such as users, hubs, and the like) may be maintained in the relationship databases 208 or some other databases. The resource distributor 304 may deliver one or more advertising resources to a hub in response to a single resource submission (e.g., one carrying a primary resource). An advertising resource may also be rated by a user 102*a*, 102*b* and selected as a prize resource (e.g., by the list maker 214). It may be presented (e.g., by the user interface 212) to a user in a pop-up window on a user device 110*a*, 110*b* when a primary resource is chosen by a user 102*a*, 102*b* for view, or as part of the presentation of the primary resource. The user 102*a*, 102*b* may not only view the primary resource and its associated advertising resource(s), but also provide ratings against each of them. Any advertising presentation policy, scheme, or rules are within the scope of various embodiments.

The score generator 306 interprets, updates and maintains scores and the like (such as ratings, rankings, votes, marks, yes/no answers, like/dislike, bless/damn/forget, mark as favorite/hide it, clicks, impression time, and so on) that may be associated with resources and other entities, such as hubs, users, relationships, and the like. It may store the scores in a central database, or in various databases such as the relationship database 208, the resource database 206, the user database 204, and the hub database 202. Based at least in part on a rating submission (including internal rating submissions, if applicable), the score generator 306 may create or retrieve a database entry (e.g., from the relationship database 208) corresponding to the score for a resource at a hub, the hub having the submitter as member, and update the entry accordingly (e.g., the score and time of update). The score generator 306 may create or retrieve a database entry (e.g., from the resource database 206) corresponding to the hub provider-wide score for a resource, and update the entry accordingly. Score update or assignment may be executed in accordance to some policy or rules. For example, if a submitter is allowed to provide (only once) either a positive or negative rating against a resource, then one point may be added to the score of a resource for a positive rating, while one point may be removed from the score for a negative rating, with the score starting from zero when the resource is first made available in a hub. The hub provider-wide score for a resource may then be the sum of all its individual scores from all hubs. Alternatively, a good score and a bad score may be maintained simultaneously for a resource (at both hub-level and provider-wide-level), each accumulating points from positive and negative ratings respectively. According to one embodiment, the list maker 214 as shown in FIG. 2 may then produce a list of popular resources for a hub using only the good scores, and a list of controversial resources based at least in part on both the good and bad scores (both of which may be regarded as list of prize resources). Yet another scoring scheme may be to regard a resource as prize at the hub level when the percentage of a hub membership that have given it a positive rating is twice or more than the percentage that have given the resource a negative rating. And a resource may receive at the hub provider level one point for every ten positive ratings within a hub, with a minimum of 100 positive ratings within the hub, regardless of any negative ratings. A scoring rule may also be that there may only be one hub or a limited number of hubs receiving the one and only one rating (positive or otherwise) given by a user 102*a*, 102*b* against a resource even though the user 102*a*, 102*b* may be member to more than one hub (not counting his private personal hub, if any). The user 102*a*, 102*b* would need to designate a home hub or a hub priority list for the score generator 306 to decide which hub should receive the rating in relation to the resource. Another scoring rule may be that ratings from a hub administrator do not count in hub-specific scores for resources in relation to the hub. While the score generator 306 may be responsible for updating and maintaining scores for resources (and for other entities such as users, hubs, and so on) in the hub provider 104, the list maker 214 is responsible for selection of prize resources. A scoring policy or scheme may involve the collaboration of both the score generator 306 and the list maker 214. Any scoring policy, scheme, or rules are within the scope of various embodiments.

The membership controller 308 monitors scores and statuses of resources and users 102*a*, 102*b* (and other entities wherever applicable) that may affect hub memberships and performs appropriate actions accordingly. For instance, there may be a rule for a particular hub that stipulates a member be removed or changed to become an observer if he has not voted for or against a resource for a specific period of time (e.g., one month) despite being eligible to do so. Another example rule may be that a member be removed if none of his submitted resources is picked as prize for the hub for a specific period of time, or three or more of his submitted resources have ever received a certain number or percentage of negative ratings from the membership in a given period of time (e.g., over 70% of membership giving negative ratings within three months of the submission of each of his submitted resources). Any membership control policy, scheme, or rules are within the scope of various embodiments.

The membership controller 308 may check the relationship database 208 and other databases whenever there is a score, status and/or time change, or be notified of such changes (e.g., by the score generator 306, the resource distributor 304, and/or an internal or external timer (not shown)). The membership controller 308 may also set up a condition and associate it with each entity of interest (e.g., in the database where the entity resides) so that the score generator 306, resource distributor 304, resource analyzer 302 would check if the condition is met prior or subsequent to its own operations. The databases may also be configured to perform some or all of this condition checking upon access, and provide the necessary notification when needed. Upon notification of such conditions, the membership controller 308 may perform its operations accordingly (e.g., further rules checking and/or subsequent member removal). In one embodiment, the membership controller may notify users of their membership being removed from a hub via the user interface 212.

Any type of hub may be provided by the hub provider 104 shown in FIG. 1. A hub may comprise people or users established or grouped according to any type of category, such as friendship, geopolitical boundaries, affiliation (e.g., having the same email domain), and so forth. A user 102*a*, 102*b* may specify the hubs, the categories, subcategories, and so forth; and/or the hubs, the social networks, the categories, the subcategories, and so on may be predetermined by the hub provider 104. A user 102*a*, 102*b* may create a hub, join an existing hub, invite other people or users to join a hub, and cease to be a member of a hub, subject to the terms, rules and policies that may be set forth by the hub provider 104 and/or the hub owner. Such terms, rules and policies may include the provisions for hub creation, hub membership and resource submission and rating.

For instance, a user 102*a*, 102*b* may connect via a desktop computer or a portable device (i.e., a user device 110*a*, 110*b* shown in FIG. 1) to a website or system embodying the hub provider 104. The device 110*a*, 110*b* is communicatively coupled with the website, namely the hub provider, over a network 106 via the communication interface 210. The user 102*a*, 102*b* provides his email address as his user ID and a string of characters as his password as part of the signup process with the hub provider (via the user interface 212). Upon successful registration, the user interface 212 would create an entry (namely, a user account entry or simply a user entry) in the user database 204 for the user.

Figure 4:
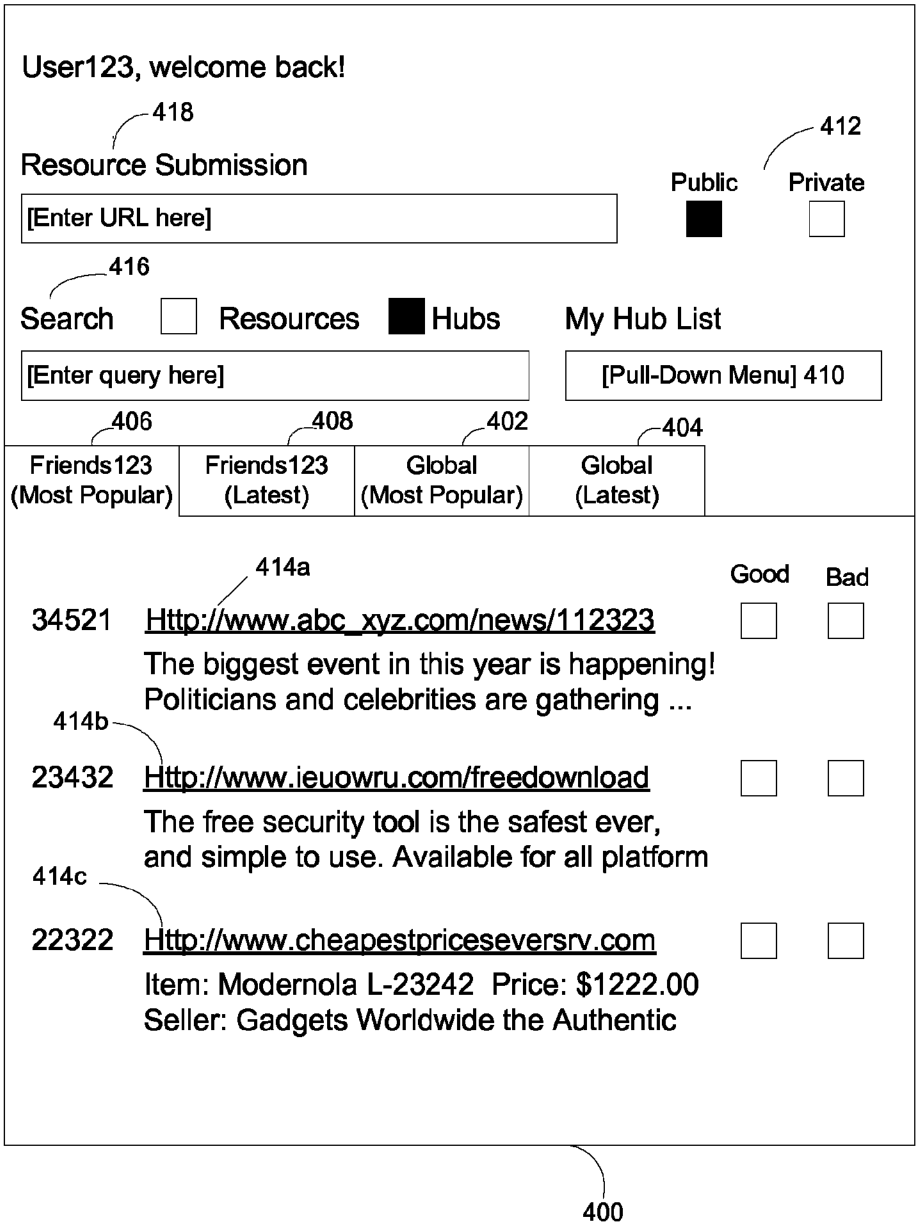
FIG. 4 shows an exemplary webpage that a user of the hub provider may be presented with upon successful logon.

FIG. 4 shows an exemplary webpage 400, which a user of the hub provider 104 may be presented with (by the user interface 212) upon successful logon. For instance, such an webpage may comprise a list or selection of provider-wide or global prize resources 402, a provider-wide or global view of latest resources 404, a pair of lists of hub-wide prize resources 406 and latest resources for a hub 408 (e.g., hub "Friends123"), a pull-down list 410 of hubs to which the user 102*a*, 102*b* is a member (from which a user 102*a*, 102*b* may select more hubs into view), a search interface 416 for resources and hubs in the hub provider 104, and a resource submission interface 418 which also allows a user 102*a*, 102*b* to specify if the resource should be made public 412. Each entry 414*a*, 414*b*, 414*c*, in the selection or list of resources may comprise a URL to the resource in question, a summary or excerpt for the resource, a hub-level and/or overall score, and a control for receiving a good or bad rating. An authenticated user 102*a*, 102*b* may locate a hub among a plurality of hubs retrieved via the search interface 416 (e.g., by school name, hobby description, organization name, a friend's name or user ID, and so on). The user 102*a*, 102*b* decides to sign up with the hub (herein named "ABC"), and is presented with membership criteria (e.g., a minimum age of 18 and a pending IQ test passed with a score of 80 or above) and agreements (e.g., initial membership of scout, but be demoted to observer if no prize resources submitted by the user within three months of membership). Such criteria and agreements may be stored and maintained in the hub database 202 or some other databases, which may also maintain other membership rules such as those for invitation, as well as rules about resources such as those for prize resource selection, public resource acceptance, resource import and export, and the like.

If the user 102*a*, 102*b* passes the criteria and accepts the agreements, then the user interface 212 may create a membership relationship between the user 102*a*, 102*b* and the hub in the relationship database 208, thereby realizing the adding of the user 102*a*, 102*b* as member to the hub. Otherwise, the signup process with the hub via the user interface 212 will be aborted, and the user 102*a*, 102*b* will be notified as such. Upon successful signup with the hub, the user's hub list will now include the hub. As such, the user 102*a*, 102*b* in this example may now view up to six non-private-personal lists: two for global latest and prize resources, two for hub Friends123's latest and prize resources, and two for hub ABC's. The list maker 214 retrieves the appropriate resources from the resource and relationship databases 208 and produces the respective lists.

Later the user 102*a*, 102*b* discovers a webpage of interest (e.g., via the same or different user device 110*a*, 110*b*), and submits the URL to the webpage to the hub provider 104 (e.g., via the resource submission interface 418 on the hub provider 104 website, or a resource submission interface 418 on a third-party tool or website, or one on the webpage of interest itself). The user interface 212 receives the resource submission via the communication interface 210, and passes it to the submission handler 216. (In some instances, the submission handler 216 may also receive the submission directly without involvement of the user interface 212.) The submission handler 216 invokes the resource analyzer 302, which checks if the resource already exists in the resource database 206. Assuming the resource already exists in the hub provider as a whole but not in hubs Friends123 and ABC, the resource distributor 304 will create a positive availability relationship between the resource (e.g., via its URL in the resource database 206) and each of the two hubs in the relationship database 208. Subsequently, other members of these two hubs may see the resource or a copy or excerpt of the resource along with its URL on the hubs' lists or selections of latest resources, which are updated by the list maker 214. The submitter member or other members may add comments to the resource. These comments may be stored and maintained in the relationship database 208 or other databases, and made available for view to all members of the same hub. According to some embodiments, members of other hubs which happen to have already included the resource in their latest and/or prize resource lists may also view these comments if both parties agree to export and import comments respectively in relation to a common resource.

As other members of hub ABC provide their ratings against the resource, the score generator 306 is updating the hub as well as overall (i.e., provider-wide) scores for the resource in the relationship database 208 or the databases where the scores are kept. The popularity of the resource in hub ABC may soon promote the resource to become a global (i.e., provider-wide) prize resource (as determined by the list maker 214) when it has so far been unable to attain such a status despite being available to many other hubs for quite a while. The resource may have also received little attention in hub Friends123.

The same user 102*a*, 102*b* in this example may join another hub (herein named "XYZ"), with the same membership criteria and agreements as hub ABC (e.g., membership status changed from scout to observer if no prize resource submissions within three months of membership). Later when the user 102*a*, 102*b* fails to meet the criteria or fulfill the agreements (as determined by the membership controller 308), the membership of the user 102*a*, 102*b* in the hub XYZ will be removed (e.g., as executed by the membership controller 308 via the removal of the corresponding membership relationship entry in the relationship database 208). The user interface 212 may also notify the user 102*a*, 102*b* of such membership removal.

According to some embodiments, one or more hubs may be provided for each user 102*a*, 102*b* in a hub provider 104. For example, a user 102*a*, 102*b* may have a hub comprised of membership established or otherwise grouped according to university attended, to the user's residence or geographical position (e.g., via location sensing modules or devices), to the user's professional status or position, to a business or organization, and so forth. In one embodiment, a common or global hub may establish or otherwise group all users 102*a*, 102*b* in a hub provider 104.

Although the hub provider 104 is described as being comprised of various components (the hub database 202, the user database 204, the resource database 206, the relationship database 208, the communication interface 210, the user interface 212, the list maker 214, and the submission handler 216), fewer or more components may comprise the hub provider 104 shown in FIG. 1 and still fall within the scope of various embodiments. Likewise, fewer or more components than those shown in FIG. 3 may comprise the activity manager 108 shown in FIG. 1 and still fall within the scope of various embodiments.

Figure 5:
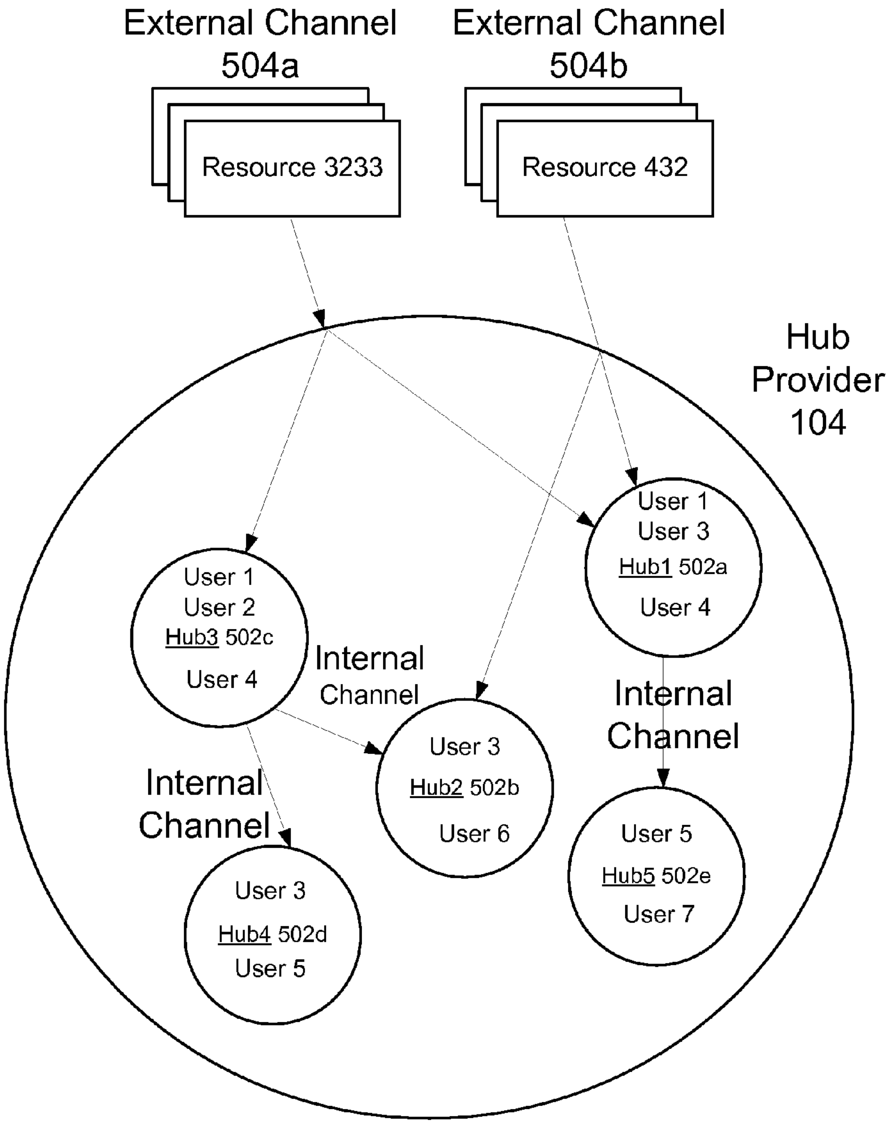
FIG. 5 shows a representation of a hub provider, and a hub-level prize resource list for five hubs, as well as the provider-wide prize resource list 506.

FIG. 5 shows a representation of a hub provider such as the hub provider 104 in FIG. 1, and a hub-level prize resource list for five hubs 502*a*, 502*b*, 502*c*, 502*d*, 502*e*, as well as the provider-wide prize resource list 506. There are two external channels of resources 504*a*, 504*b* that hubs in the hub provider may subscribe to or otherwise obtain resources from. These two channels 504*a*, 504*b* have Resource 3233 and Resource 432 respectively. Hub1 502*a* and Hub3 502*c* receive resources from the former channel while Hub1 502*a* and Hub2 502*b* receive resources from the latter channel. Hubs may also subscribe to or otherwise obtain resources from other hubs. For example, Hub2 502*b* and Hub4 502*d* receive resources from Hub3 502*c*, while Hub5 502*e* receives resources from Hub1 502*a*. Hub1 502*a* and Hub3 502*c* are referred to as internal channels. A user may belong to more than one hub. For example, User1 belongs to Hub1 502*a* and Hub3 502*c*, while User3 belongs to Hub1 502*a*, Hub2 502*b*, and Hub4 502*d*. According to one embodiment, a hub may specify criteria for selecting incoming resources from an external or internal channel. For example, a hub may only import prize resources from another hub. According to another embodiment, a hub may perform export control on its resources, whether created internally, or imported from external or internal channels. For example, a hub may make available only a subset of resources to other hubs for subscription, while restricting other resources for internal consumption only. The former may be referred to as public resources, while the latter as private resources with respect to the hub. All members of the hub may designate individual resources as private or public, or only those with certain privileges such as the hub owner or administrator may make resources public.

Figure 6:
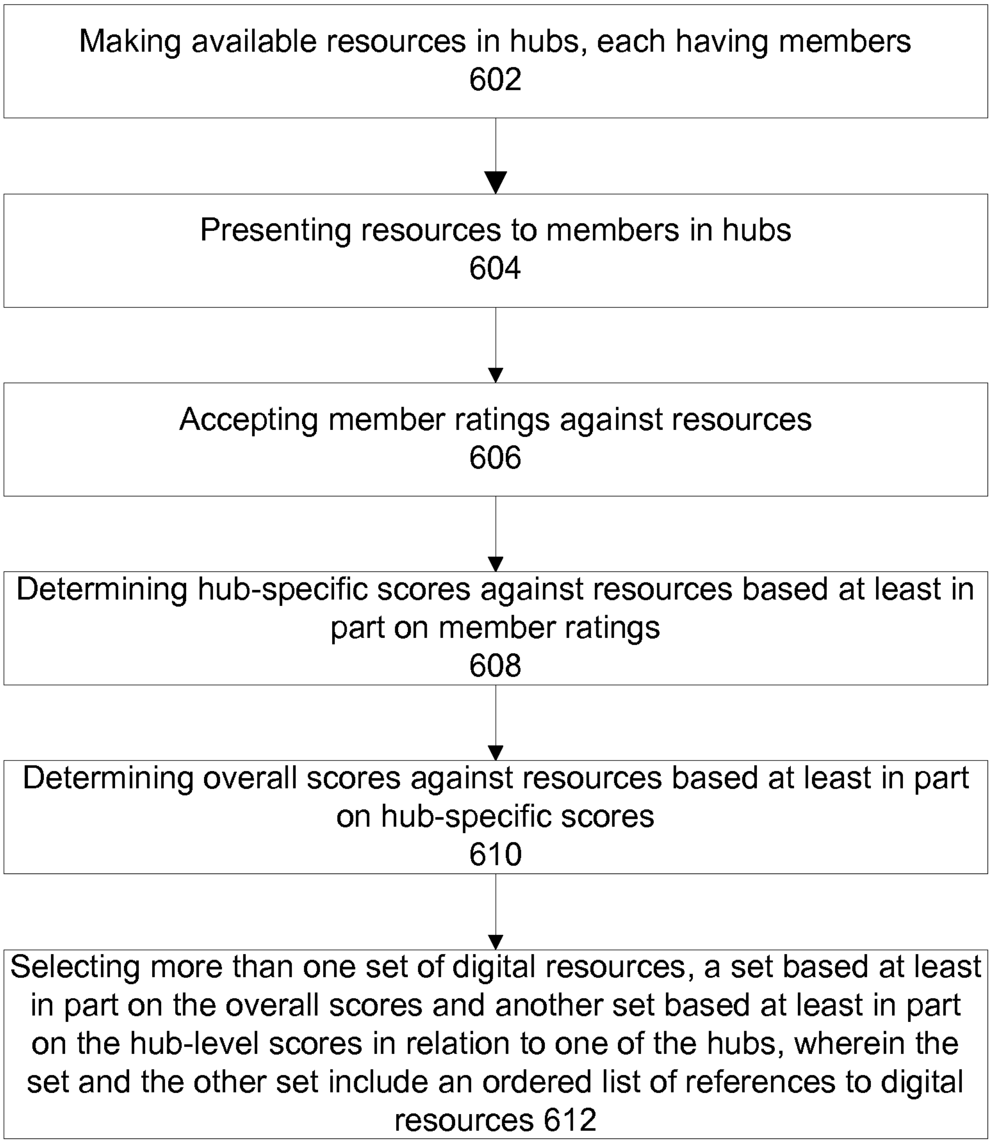
FIG. 6 shows a flow diagram of an exemplary process for selecting more than one set of digital resources among a plurality of resources via a hub provider.

FIG. 6 shows a flow diagram of an exemplary process for selecting more than one set of digital resources among a plurality of resources via a hub provider 104. For instance, a user 102*a*, 102*b* via a user device 110, 110*b* such as one shown in FIG. 1 may make available 602 one or more resources to a hub provider by sending or submitting their references (e.g., URLs) over a network 106. The hub provider 104 may comprise a plurality of hubs each having members, where the user 102*a*, 102*b* may be member to one or more of the hubs, subject to membership criteria and agreements, and other applicable constraints. The submitting may include sending a user ID (and password if not yet authenticated as a user 102*a*, 102*b* of the hub provider 104), and other information, such as comment or some initial rating.

The hub provider 104 may then make available the resource (and/or its representative reference, copy, or other equivalent entities or objects) to all the members of the hubs to which the resource is destined 604, e.g., by the membership of the user 102*a*, 102*b* in the hubs, the policy in public resource acceptance of the other hubs, and the like. For example, the user interface 212 of the hub provider 104, upon receipt of the submission, may pass it to the submission handler 216 which invokes the resource analyzer 302. The resource analyzer 302 may determine that the resource is not yet available to the hubs to which the user 102*a*, 102*b* is member, so it adds the resource to the hubs via positive resource availability entries in the relationship database 208. The list maker 214 may then make the resource available on the list of latest resources for each of the hub.

The hub provider 104 may accept ratings from members whose hubs have the resource in question available 606, and determine a hub-level or hub-specific score against the resource for each of the hubs 608, based at least in part on these member ratings. For example, the user interface 212 may receive a rating submission from a user 102*a*, 102*b* or user device 110*a*, 110*b* via the communication interface 210. The user interface 212 then passes it to the submission handler 216 which invokes the score generator 306. The score generator 306 may update the score for the relationships between the resource and each of the applicable hubs in the relationship database 208.

The hub provider 104 may also determine an overall score 610 against the resource based at least in part on its hub-level or hub-specific scores. Such overall scores associated with resources in the hub provider 104 may drive, enable or otherwise facilitate the hub provider 104 to select more than one set of prize digital resources 612, the more than one set of prize digital resources comprising a set based at least in part on the overall scores, and another set based at least in part on the hub-level scores in relation one of the hubs in the hub provider 104, wherein the set and the other set include an ordered list of references to digital resources, the references comprising URLs each accompanied by a score, the score being an overall score or a hub-level score. For example, the score generator 306 may calculate and maintain an overall score (e.g., in the resource database 206) for each of the resources in the hub provider 104, in addition to updating their hub-level scores. The list maker 214 may identify global prize resources 402 based at least in part on these overall scores, and produce a selection or list of global prize resources 402 accessible (e.g., via the user interface 212) to all members of the hub provider 104. Generation or production of such a selection or list may take place continuously, on-demand, periodically, or from time to time.

Similar to prize resources, a prize member may be determined at the hub level, for instance, based at least in part on his contribution to making available prize resources to the hub in question, and a prize user 102*a*, 102*b* based at least in part on the hub-level scores the resources that he has made available to the hub provider 104 have received. (In an embodiment, a user may receive points towards his obtaining a prize status for resources he has made public that other hubs, i.e., those to which he is not a member at the time of submission, have then considered as prize.) A prize hub may be determined, for instance, based at least in part on the number or percentage of provider-wide prize resources made available by the hub in question over a given period of time, or based on the number or percentage of hubs per some category whose prize lists have included resources that originated from the hub.

A plurality of embodiments are specifically illustrated and/or described herein. However, it will be appreciated that modifications and variations are covered by the above teachings and within the scope of the present invention without departing from the spirit and intended scope thereof. For example, a hub provider 104 may provide a set of rules or rule templates for various aspects of a hub-related maintenance and operations, such as those for membership admission, invitation and removal, and those for resource submission and (hub-specific) resource rating and list making. A hub owner or authority (e.g., the creator of the hub, one or more members elected by others in the hub, and so on) may choose among these rules or rule templates to form a specific membership policy for the hub. Rules or rule templates for changing existing rules may also be provided by the hub provider 104. A hub may also be associated with an external or third-party component or system for conducting membership admission testing, such as an IQ test. The user interface 212 may be configured to invoke such a component or system upon a user request for membership to a specific hub, cause the user 102*a*, 102*b* or the user device 110*a*, 110*b* to interact with the component or system, and then receive the testing result from the component or system. The user interface 212 may also monitor how a user interacts or otherwise selects resources in the hub provider 104 to generate (internal) rating submissions. A user 102*a*, 102*b* may also send the hub provider 104 via a user device 110*a*, 110*b* a single submission comprising more than one resource and/or rating. The user interface 212 may provide a search interface 416 whereby a user may perform personalized queries against the resources in the hub provider 104. For example, he may enter queries comprising keywords against only the resources he has submitted or rated positively. A user 102*a*, 102*b* or a hub authority may also specify criteria for filtering and sorting resources available to him or the hub. For example, a user 102*a*, 102*b* may hide a resource from his personal view either for his own private personal hub or another hub. Such a request and another subsequent change may cause the user interface 212 to generate a rating submission against the resource, e.g., for the calculation of the overall score for the resource in question. A hub provider 104 embodying the present invention may provide hubs in a specific category, including but not limited to advertising, retail goods and services, or news and journalism. A hub provider 104 may also specify various categories of hubs (e.g., lifestyle, politics, science and technology, literature, and the like), where a user 102*a*, 102*b* may create a new category. A hub provider 104 may stipulate that a user 102*a*, 102*b* may only join one hub per category, or become a voting or rating member to one hub (per category or per hub provider 104) while being allowed to be observer to all other hubs. A hub provider 104 may detect or determine hubs common in interest and thereby suggest merging of these hubs. Users may also be recommended for membership to hubs or review of resources based on his interests that may be deduced or induced from his memberships with other hubs, his resource and rating submissions, or some other observations or testing, including but not limited to questionnaires and personality profiling. The hub provider 104 may also identify and publicly recognize a user 102*a*, 102*b* or hub for his or its ability to discover prize resources, and award or otherwise assign a title or rank to the user 102*a*, 102*b* or the hub. Ratings or scores of such a prize user or prize hub may receive more weight than other non-prize users or hubs for hub-level or overall score generation. In embodiments, a user in a hub provider may not need to join or belong to any hub. He or she may be presented with a list of provider-wide prize resources.

A hub provider 104 may comprise a plurality of hub providers 104. For example, a system or website may be a hub provider 104 for a number of news publishers each being a hub provider 104 for its subscribers, who may join or create hubs of their interest. A hub may also comprise a plurality of hubs. For example, a hub may refer to a country and have state or province hubs, each further comprising city or town hubs. Ratings or scores may be amalgamated or consolidated for each higher level (e.g., by the summation of lower-level scores or some other schemes) for entities or objects of interest, such as resources, hubs, users and the like. A system or service may be equipped or otherwise embodying the features of the present invention in addition to its inherent functionality. For example, a search service or engine may initially partition or assign its users 102*a*, 102*b* into different geographical areas or locations each area or location being a hub, and allow them to join other hubs (of types other than geographical area or location, e.g., shopping, health, entertainment, travel, and so on). The users may join and quit any of these hubs freely in relation to their queries. The search engine may monitor or track resources selected by the users from search results, and the queries responsible for the search results. The user-selected resources may be considered as having better ratings than those not selected from the search results. Each resource may then be associated with a relevancy score for the hub(s) in question, while having a global relevancy score. In response to queries, the search engine may present the users with search results comprising groups of relevant resources or their references, one group corresponding to their overall relevancy scores, while each of the others corresponding to a specific hub. Relevant resources in more than one hub of interest (e.g., geographical location hub “Seattle” and context hub “Travel”) may further be consolidated to produce a selection or list of resources based on their consolidated hub-level scores. For example, a logical hub of “Travel from Seattle” may be created (e.g., on the fly in response to queries from users having membership in both “Travel” and “Seattle”) to account for resources that are applicable to both hub “Travel” and hub “Seattle”, and assume their consolidated hub-level score (e.g., by summation of their individual hub-level scores, or some other schemes). A social networking website or system, or an application on the website or system, may provide its members with the provision to create hubs based on friendship, topic, organization or professional affiliation, brand, and so on. A peer-to-peer resource sharing website or system may allow its users to share music, videos or retail offers among groups or circles of friends or people, each group or circle being a hub. A member may share the availability of a song, video or retail offer with his peers in the group or circle, and provide indication or action interpretable as a rating, such as its being his favorite, a good deal, a purchase, a watched video, and so on. Some action or indication may result in a higher rating than another, e.g., a purchase resulting in a higher rating than being a favorite.

In addition to selections or lists of latest, prize, or controversial resources, a hub provider 104 or individual hubs in a hub provider 104 may include other types of selections or lists. For example, a list of pending prize resources may include resources that have attained some intermediary level of scores, so that users 102*a*, 102*b* or members may be led or otherwise suggested to view or review such pending prize resources so to obtain better consensus or more ratings on their way to being included in a prize selection or list. According to some embodiments, a hub provider 104 could determine a resource that has a high negative score in one hub while a high positive score in another hub to be a prize resource for the latter hub and not the former, and yet consider both scores as a positive contribution to the overall score of the resource, for example, for a list of controversial resources.

Furthermore, a hub provider 104 may also be equipped with facilities or components to allow users to generate their own digital resources, which may be derived from resources submitted from other users. For example, a user may create a resource comprising an incoming resource, and his editorial or opinion about that resource. A digital resource may also be specific to a certain type of resources and be created in accordance to some templates or guidelines. For example, an offer of goods and services may include an item name, seller information, price, and optional quantity. Membership to hubs or delivery of resources may require payment. A hub provider 104 may be equipped with a component or otherwise configured to trigger a component or system to handle such payment. A submitter may also receive payments for resource submissions whose resources or their related or associated ads that have received a certain level of attention, e.g., becoming a prize resource. For example, an online newspaper may register as or otherwise become a hub, with subscribers as members and other content distributors/aggregators being hubs that receive news items from the online newspaper. Resource usage (e.g., impressions, clicks, transactions, and the like) may also be metered, e.g., for payment or revenue. A portion of such revenue may be distributed to users responsible for submitting or otherwise making available those resources.

Moreover, a resource may be a composite, comprising a plurality of resources, including resources of different categories or sources, e.g., ads on a new article, or still photos in a video, and so on. A reference to a resource may involve different scopes, e.g., a URL may refer to a single webpage or a website including all URLs comprising the URL. A resource submission may include annotations, tags and other information to qualify or otherwise annotate the resource, such as whether the URL refers to a webpage or a website, the topic to which the resource is relevant to, a summary of item, seller, quantity, and price to an offer, and so on. A reference to a resource needs not be explicitly available or accessible online to a user 102*a*, 102*b*. For instance, an brick-and-mortar retail offer comprising an item name, seller information and price may be presented or otherwise accessible via a list of offers, where a user 102*a*, 102*b* may choose one among the list, where the hub provider 104 would maintain internal references to such offers. Answers from a user 102*a*, 102*b* to a series of questions may also help determine a resource without revealing the resulting resource(s), e.g., a personality profile or characterization, to the user 102*a*, 102*b*. How the chosen or resulting resources correspond to one another may be established or otherwise determined by the hub provider 104.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. For instance, method steps described herein may be performed in alternative orders. Various embodiments of the invention include logic stored on physical computer readable storage media, or embodied in signals in computer readable transmission media, the logic configured to perform methods of the invention. The examples provided herein are exemplary and are not meant to be exclusive.

What is claimed:

1. A method for rating a digital resource for heterogeneous groups of members, comprising:

making the digital resource available to a first hub and a second hub, the first hub comprising a first plurality of members and the second hub comprising a second plurality of members, the first plurality of members differing from the second plurality of members, each member having a member account;

receiving a first rating for the digital resource from a first member of the first hub;

receiving a second rating for the digital resource from a second member of the second hub;

determining a first hub-level score for the first hub based on the first rating;

determining a second hub-level score for the second hub based on the second rating;

determining an overall score for the digital resource based on the first hub-level score that is based on the first rating from the first member and the second hub-level score that is based on the second rating from the second member;

storing an indication of the first hub-level score, second hub-level score, and overall score in a memory; and providing the first hub-level score to a member of the first plurality of members.

2. The method of claim 1, further comprising:

identifying a third member as a member of the first hub; and presenting the third member with the first hub-level score based on the third member being a member of the first hub.

3. The method of claim 2, further comprising:

receiving an indication to present a fourth member of the second hub with a rating for the digital resource; and presenting the fourth member with the second hub-level score based on the fourth member being a member of the second hub.

4. The method of claim 3, further comprising:

receiving an indication to present a fifth member with a rating for the digital resource, the fifth member not belonging to the first hub or the second hub; and presenting the fifth member with the overall score based on the fifth member not belonging to the first hub or the second hub.

5. The method of claim 1, wherein no member is a member of more than one hub.

6. The method of claim 1, further comprising:

receiving an indication of a third member attempting to join the first hub;

determining that the third member is eligible to be a member of the first hub based on what the third member is, where the third member claims to reside or is located, what the third member claims to believe, what the third member can do, or what digital resources the third member has given a favorable rating; and creating a member account for the third member in the first hub based on determining that the third member is eligible to be a member of the first hub.

7. The method of claim 6, further comprising:

receiving an indication of a fourth member attempting to join the first hub;

determining that the fourth member is not eligible to be a member of the first hub based on what the fourth member is, where the fourth member claims to reside or is located, what the fourth member claims to believe, what the fourth member can do, or what digital resources the fourth member has given a favorable rating; and determining not to create a member account for the fourth member in the first hub based on determining that the fourth member is not eligible to be a member of the first hub.

8. The method of claim 6, further comprising:

determining to remove the third member from the first hub; and removing the third member from the first hub.

9. The method of claim 8, further comprising:

determining to remove the third member from the first hub based on the third member not voting on any digital resource for a period of time, none of the third member's submitted digital resources being selected as a prize resource for the first hub for a second period of time, or because a threshold number of submitted digital resources have received a threshold amount of negative ratings.

10. The method of claim 1, further comprising:

receiving a query from the first member indicating a physical location;

determining a third hub based on the physical location; and sending the first user an indication of a hub-level score for a second resource in the third hub.

11. The method of claim 1, further comprising:

determining a first advertisement for the digital resource for the first hub;

determining a second advertisement for the digital resource for the second hub;

responding to a first query from the first member in the first hub by sending the first member an indication of the digital resource and an indication of the first advertisement; and responding to a second query from the second member in the second hub by sending the second member an indication of the digital resource and an indication of the second advertisement.

12. The method of claim 1, further comprising:

receiving an indication of a third member attempting to join the first hub; and making the third member a member of the first hub in response to determining that the third member meets a criteria for membership.

13. The method of claim 12, further comprising:

receiving an indication of a fourth member attempting to join the first hub; and determining not to make the fourth member a member of the first hub in response to determining that the fourth member does not meet the criteria for membership or another criteria for membership.

14. The method of claim 1, further comprising:

receiving a comment on the digital resource from the first member in the first hub; and in response to receiving a query from the second member in the second hub, and in response to determining that comments may be exported between the first hub and the second hub, determining to send the second member an indication of the digital resource and an indication of the comment.

15. The method of claim 1, wherein the second rating is a negative rating.

16. The method of claim 15, further comprising:

in response to determining that the first hub-level score is highly positive and the second hub-level score is highly negative designating the digital resource as having a high controversial score.

17. The method of claim 1, further comprising:

receiving a request from a third member to join a hub provider that supports the first and second hubs;

determining, based on a physical location of the third member to make the third member a member of a third hub; and making the third member a member of the third hub.

18. The method of claim 1, wherein a third hub comprises the first hub and the second hub.

19. The method of claim 1, further comprising:

determining that the first hub is a prize hub based on a number of resources originated from the first hub that have a high overall score.

20. The method of claim 1, further comprising:

determining that the first member is a prize member of the first hub based on determining that the hub-level scores of digital resources the first member has submitted to the first hub are high.

21. The method of claim 1, further comprising:

determining that the first member is a prize member of a hub provider supporting the first and second hubs based on determining that the overall scores of digital resources the first member has submitted to the first hub are high.

22. The method of claim 1, further comprising:

receiving a request from the third member to join the first hub; and in response to determining that the first hub is private to the first member, denying the request from the third member to join the first hub.

23. A non-transitory computer-readable storage medium for rating a digital resource for heterogeneous groups of members, bearing computer-readable instructions that, when executed upon a computer, cause the computer to perform operations comprising:

making the digital resource available to a first hub and a second hub, the first hub comprising a first plurality of members and the second hub comprising a second plurality of members, the first plurality of members differing from the second plurality of members, each member having a member account;

receiving a first rating for the digital resource from a first member of the first hub;

receiving a second rating for the digital resource from a second member of the second hub;

determining a first hub-level score for the first hub based on the first rating;

determining a second hub-level score for the second hub based on the second rating;

determining an overall score for the digital resource based on the first hub-level score that is based on the first rating from the first member and the second hub-level score that is based on the second rating from the second member;

storing an indication of the first hub-level score, second hub-level score, and overall score in a memory; and providing the first hub-level score to a member of the first plurality of members.

24. The computer-readable storage medium of claim 23, wherein receiving the first rating for the digital resource from the first member of the first hub comprises:

accepting the first rating based on determining that the first member has reviewer access to the first hub, and further comprising:

accepting a submitted digital resource from a third member of the first hub based on determining that the third member has scout access to the first hub.

25. The computer-readable storage medium of claim 23, further bearing computer-readable instructions that, when executed on the computer, cause the computer to perform operations comprising:

accepting a submitted digital resource from a third member of the first hub; and determining to make the submitted digital resource available to the first hub but not to the second hub based on determining that the third member has indicated that the submitted digital resource is to have privacy.

26. The computer-readable storage medium of claim 23, further bearing computer-readable instructions that, when executed on the computer, cause the computer to perform operations comprising:

accepting a submitted digital resource from a third member of the first hub; and determining to make the submitted digital resource available to the first hub and to the second hub based on determining that the third member has indicated that the submitted digital resource does not have a privacy restriction.

27. The computer-readable storage medium of claim 23, wherein receiving the first rating for the digital resource from the first member of the first hub comprises:

accepting the first rating based on determining that the first member has reviewer access to the first hub, and further comprising:

determining that a third member of the first hub may neither submit a digital resource to the first hub nor review the digital resource based on determining that the third member has observer access to the first hub.

28. The computer-readable storage medium of claim 23, wherein the first member is part of a plurality of members of the first hub, and further bearing computer-readable instructions that, when executed on the computer, cause the computer to perform operations comprising:

determining that the first member is a prize member among the plurality of members of the first hub based on the first member having submitted a set of digital resources to the first hub that have a higher hub-level rating than submissions of another member of the plurality of members.

29. The computer-readable storage medium of claim 23, wherein the digital resource is part of a plurality of digital resources of the first hub, and further bearing computer-readable instructions that, when executed on the computer, cause the computer to perform operations comprising:

determining that the digital resource is a prize resource among the plurality of digital resources of the first hub based on the digital resource having a higher hub-level score for the first hub than the hub-level score of another digital resource of the plurality of digital resources for the first hub; and displaying an indication that the digital resource is the prize resource.

30. The computer-readable storage medium of claim 23, wherein determining the first hub-level score for the first hub based on the first rating comprises:

determining the first hub-level score for the first hub based on the first rating based on a scoring system; and wherein determining the second hub-level score for the second hub based on the second rating comprises:

determining the second hub-level score for the second hub based on the second rating based on the scoring system.

31. The computer-readable storage medium of claim 23, wherein the first hub and second hub are both provided by a hub provider.

32. The computer-readable storage medium of claim 23, further bearing computer-readable instructions that, when executed on the computer, cause the computer to perform operations comprising:

in response to determining that the first user has not rated any digital resource for a period of time, modifying the first member's permissions so that the first member may view digital resources but not rate digital resources.

33. A system for generating a plurality of selections of resources from a plurality of resources, comprising:

a processor; and a memory communicatively coupled to the processor when the system is operational, the memory bearing computer-readable instructions that, when executed by the processor, cause the system at least to:

make the digital resource available to a first hub and a second hub, the first hub comprising a first plurality of members and the second hub comprising a second plurality of members, the first plurality of members differing from the second plurality of members, each member having a member account;

receive a first rating for the digital resource from a first member of the first hub;

receive a second rating for the digital resource from a second member of the second hub;

determine a first hub-level score for the first hub based on the first rating;

determine a second hub-level score for the second hub based on the second rating;

determine an overall score for the digital resource based on the first hub-level score that is based on the first rating from the first member and the second hub-level score that is based on the second rating from the second member;

store an indication of the first hub-level score, second hub-level score, and overall score; and provide the first hub-level score to a member of the first plurality of members.

34. The system of claim 33, wherein the memory further bears computer-readable instructions that, when executed by the processor, cause the system at least to:

in response to determining that the first member has a hub priority list comprising the first hub and a third hub, determine the first hub-level score for the first hub based on the first rating, and a third hub-level score for the third hub based on the first rating.

35. The system of claim 34, wherein the memory further bears computer-readable instructions that, when executed by the processor, cause the system at least to:

determine the third hub-level score as a score lower than the first hub-level score based on the third hub having a lower priority than the first hub in the hub priority list.

36. The system of claim 33, wherein the memory further bears computer-readable instructions that, when executed by the processor, cause the system at least to:

receive the digital resource at the first hub; and in response to determining that a subscription indication for the digital resource is public, share the digital resource with the second hub.

37. The system of claim 33, wherein the memory further bears computer-readable instructions that, when executed by the processor, cause the system at least to:

receive the digital resource at the first hub; and in response to determining that a subscription indication for the digital resource is a prize resource at the first hub, share the digital resource with the second hub.

38. A system for presenting a plurality of selections of digital resources among a plurality of digital resources, comprising:

a non-transitory hub storage medium for storing a plurality of hubs in a database;

a non-transitory user storage medium for storing a plurality of user accounts in a database;

a non-transitory resource storage medium for storing a plurality of resources in a database;

a non-transitory relationship storage medium for storing a plurality of relationships in a database;

a communication interface component configured to send and receive data to and from a user via a user device over a network, the user having a user account in the user storage medium, the user having a membership relationship between the user account and one or more of the plurality of hubs in the relationship storage medium, and the data including one or more submissions, each having a recommended resource or a rating, a user ID relative to the user account, the recommended resource comprising a reference to a resource, and the rating comprising a target resource, wherein the target resource includes a recommended resource;

a submission handler component configured to receive one or more recommended resources and one or more recommended ratings;

a resource analyzer component configured to determine if each of the one or more recommended resources exists in the resource storage medium, and to add the recommended resource to the resource storage medium if the recommended resource does not already exist in the resource storage medium, the recommended resource including an overall score, a user ID to a user account, and a timestamp;

a resource distributor component configured to determine whether an availability relationship between the recommended resource and each of the one or more hubs exists in the relationship storage medium, and to add an availability relationship between the recommended resource and each hub in the relationship storage medium if the availability relationship does not already exist in the relationship storage medium, the availability relationship including a hub-level score, the user ID relative to the user account, and a timestamp;

a score generator component configured to determine if an availability relationship between each of the one or more target resources and each of the one or more hubs exists in the relationship storage medium, and to update the hub-level score in the availability relationship based at least in part on the rating if the availability relationship exists in the relationship storage medium, and to update the overall score in the target resource in the resource storage medium based at least in part on the hub-level score;

a list maker component configured to generate a plurality of selections of digital resources, the generating including determining a first selection based at least in part on the overall score of each of the digital resources in the resource storage, and a second selection based at least in part on the hub-level score of each of the digital resources in a first hub of the one or more hubs, the generating including presenting the plurality of selections to the user via the user device, wherein the first selection includes the overall scores, and the other selections includes the hub-level scores; and a user interface component configured to interact with the user via the user device, the interacting including receiving the one or more resource submissions from the user, and presenting the plurality of selections of digital resources to the user.

39. The system of claim 38, further comprising:

a membership controller component configured to:

check whether an activity relationship between the user account relative to the user and the first hub exists in the relationship storage medium within a period of time;

assert that the user be removed from the one hub when the activity relationship does not exist in the relationship storage medium within the period of time; and remove in the relationship storage medium the membership relationship between the user account in relation to the user and the first hub when the user should be removed from the first hub.

40. The system of claim 39, wherein the activity relationship includes submission of a resource to the first hub, or rating of a resource in the first hub.

* * * * *